US010133496B1

(12) United States Patent
Ferreyra et al.

(10) Patent No.: US 10,133,496 B1
(45) Date of Patent: Nov. 20, 2018

(54) BINDABLE STATE MAINTAINING COMPONENTS

(71) Applicant: Amazon Technologies, Inc., Seattle, WA (US)

(72) Inventors: Juan Pablo Ferreyra, Lake Forest, CA (US); Brian David Fisher, Irvine, CA (US); Adam Julio Villalobos, Kirkland, WA (US); Yu Ping Hu, Mission Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 15/182,922

(22) Filed: Jun. 15, 2016

(51) Int. Cl.
   *G06F 12/00* (2006.01)
   *G06F 3/06* (2006.01)
   *G06T 11/60* (2006.01)
   *G06T 7/73* (2017.01)
   *G06T 19/00* (2011.01)

(52) U.S. Cl.
   CPC ............ *G06F 3/0619* (2013.01); *G06F 3/065* (2013.01); *G06F 3/067* (2013.01); *G06T 7/75* (2017.01); *G06T 11/60* (2013.01); *G06T 19/006* (2013.01); *G06T 2219/2004* (2013.01); *G06T 2219/2008* (2013.01)

(58) Field of Classification Search
   CPC ........ G06F 3/0619; G06F 3/065; G06F 3/067; G06T 7/75; G06T 11/60; G06T 17/10; G06T 2219/2004; G06T 2219/2008; G06T 19/006
   See application file for complete search history.

(56) References Cited

U.S. PATENT DOCUMENTS

| 7,516,323 | B2 * | 4/2009 | Inoue | ...................... G06F 21/57 |
| | | | | 712/203 |
| 2001/0018701 | A1 * | 8/2001 | LiVecchi | ............... G06F 9/4881 |
| | | | | 718/105 |
| 2011/0004641 | A1 * | 1/2011 | Roberts | ............... G06F 12/0269 |
| | | | | 707/813 |

(Continued)

OTHER PUBLICATIONS

"Two Generals' Problem"; https://en.wikipedia.org/wiki/Two_Generals%27_Problem; Wikipedia; from Jan. 31, 2016; 3 pages.

*Primary Examiner* — Prasith Thammavong
(74) *Attorney, Agent, or Firm* — Baker & Hostetler LLP

(57) ABSTRACT

The disclosed techniques may employ components referred to herein as atoms for computing and maintaining of states. Unlike traditional actors, atoms may be capable of binding to other atoms to form a bound combination of atoms, referred to herein as a molecule. In some examples, while bound to other atoms, an atom may operate in a manner that is different from traditional actors. For example, in some cases, atoms that are bound to one another may be prohibited from concurrently performing different operations on their own separate states. Additionally, bound atoms may be operable to collectively (e.g., synchronously) perform shared operations on their associated states. Furthermore, a shared operation performed on the states of bound atoms may be performed atomically. Also, in some examples, bound atoms may be capable of communicating synchronously with one another and of synchronously accessing each other's states.

20 Claims, 12 Drawing Sheets

(56) References Cited

U.S. PATENT DOCUMENTS

| | | | |
|---|---|---|---|
| 2014/0019717 A1* | 1/2014 | Yamashita | G06F 9/52 |
| | | | 712/42 |
| 2014/0189256 A1* | 7/2014 | Kranich | G06F 9/526 |
| | | | 711/147 |
| 2015/0324202 A1* | 11/2015 | Ma | G06F 9/3838 |
| | | | 712/217 |
| 2016/0246613 A1* | 8/2016 | Kapadia | G06F 11/30 |

* cited by examiner

BINDABLE STATE MAINTAINING COMPONENTS

BACKGROUND

Some computing systems may employ an actor-based model for performing of various computing operations. For example, actor-based models may sometimes be employed to perform operations associated with graphical objects in video games and other electronic media, operations associated with electronic mail, web services, and other operations. The actors may be, for example, computational units that are capable of maintaining state. For example, actors may receive and respond to various messages and may also send messages to other actors. Actors may, for example, change state in response to receiving of messages. In some examples, actors may be capable of performing various operations concurrently or partially concurrently with other actors, which may, in some cases, improve efficiency and allow improved utilization of modern computing processing capabilities. While the actor-based model may provide a number of benefits, it may also result in a number of drawbacks. For example, in some cases, it may be advantageous to allow various operations to be performed collectively (e.g., synchronously) on multiple different actor states, to allow operations to be performed atomically on multiple different actor states, and to allow synchronous communications and synchronous access to states between different actors. Many conventional actor-based systems, however, may not provide capability to perform operations such as those described above and other advantageous operations.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
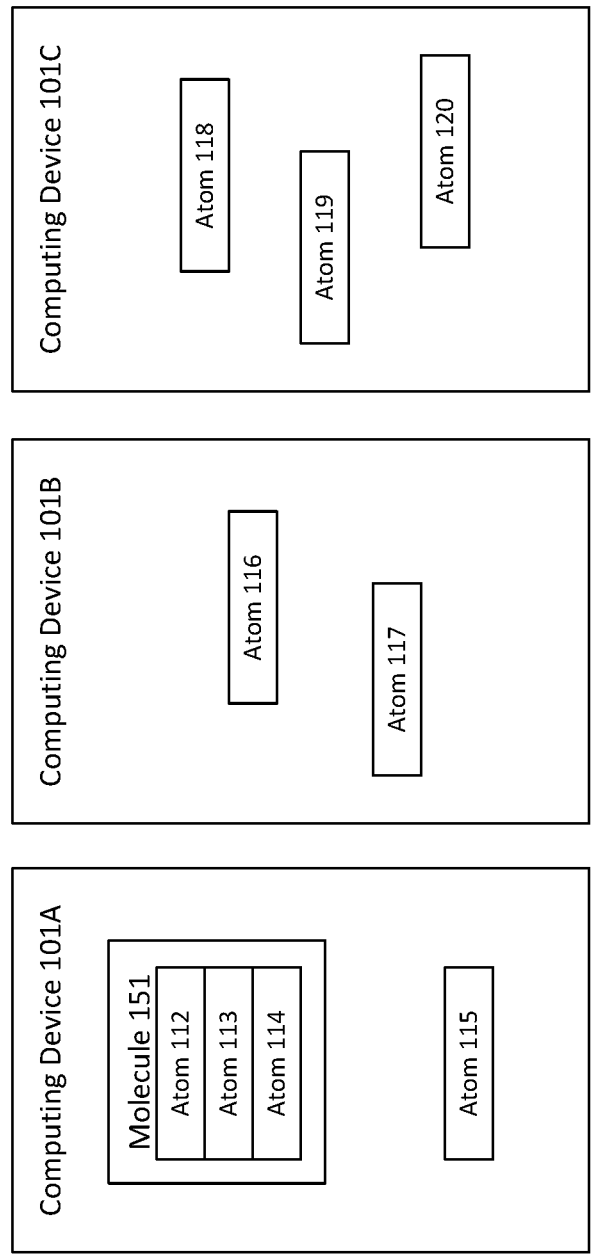
FIG. 1 is a diagram illustrating an example system for operation of bindable state maintaining components that may be used in accordance with the present disclosure.

Techniques for operation of bindable state maintaining components are described herein. In some examples, the disclosed techniques may be employed for providing of certain computing services that may have traditionally been provided using an actor-based model, such as certain video gaming and other electronic media services, services associated with electronic mail, web services, and other services. The disclosed techniques may, in some examples, provide many or all of the same benefits as the actor-based model, such as operational concurrency and parallelism, computational efficiency and reliability, and others. However, as will be described in detail below, the disclosed techniques may also provide a number of additional capabilities that may not be available in many conventional actor-based systems, such as performing various operations collectively (e.g., synchronously) on multiple different states, performing operations atomically on multiple different states, allowing certain synchronous communications and synchronous access to states, and many others.

As set forth above, in the actor-based model, computing and maintaining of states are performed by actors. For example, the actors may be computational units that may change their respective maintained states, such as based on receiving and responding to various messages, and may also send messages to other actors. As a specific example, in the context of a video game, actors may be responsible for maintaining states associated with different objects within the game world, such as states of characters, vehicles and other game objects. Instead of traditional actor components, the disclosed techniques may employ other components, referred to hereinafter as atoms, for computing and maintaining of states. Similar to traditional actors, atoms are state maintaining components that may, in some examples, have an associated address, send, receive, and respond to messages and perform operations associated with computation and adjustment of their associated state. However, unlike traditional actors, atoms may be capable of binding to other atoms to form a bound combination of atoms, which is referred to hereinafter as a molecule. Additionally, atoms may also be capable of unbinding from other atoms such that they are no longer included in a molecule. Furthermore, in some examples, atoms may also be operable to switch between different modes of execution. In particular, when an atom is not bound to any other atoms, the atom may execute in a first execution mode, referred to hereinafter as an unbound execution mode. In some examples, while in the unbound execution mode, atoms may operate in a manner that is similar or identical to traditional actors. For example, unbound atoms may concurrently process different operations (e.g., asynchronously) on their own separate states. By contrast, when an atom is bound to one or more other atoms, the atom may operate in a second execution mode, referred to hereinafter as a bound execution mode. In some examples, while in the bound execution mode, an atom may operate in a manner that is different from traditional actors. For example, in some cases, atoms that are bound to one another may be prohibited from concurrently performing different operations on their own separate states. Additionally, bound atoms may be operable to collectively (e.g., synchronously) perform shared operations on their associated states. Furthermore, a shared operation performed on the states of bound atoms may be performed atomically, for example such that subsequent operations are not performed on the bound atoms until a shared operation is fully performed on each associated atom state. Also, in some examples, bound atoms may be capable of communicating synchronously with one another and of synchronously accessing each other's states. Additionally, in some examples, the states and state changes of bound atoms may also be saved and loaded consistently with one another.

In some examples, binding of atoms may be triggered based on various binding conditions. For example, a first atom may send an asynchronous message to a second atom that includes a synchronous reference to the first atom. As another example, the first atom may insert within its state a synchronous reference to the second atom. As yet another example, a first atom may issue an asynchronous request with asynchronous references to itself and to a second atom, and this asynchronous request may, in turn, invoke a synchronous function that is provided with synchronous references to the first and the second atom. Upon detecting of these or other binding conditions, the atoms that will be bound together may be set into a binding-enabled state. For example, setting first and second atoms into a binding-enabled state may include determining whether the atoms are executing on the same computing device, and, if not, migrating the first atom such that it executes on the same computing device as the second atom to which it is being bound. In other examples, as an alternative to migrating the first atom, master control of the first atom may instead be passed to a replica of the first atom that executes on the same computing device as the second atom (provided that such a replica exists). Additionally, in some examples, setting of atoms into a binding-enabled state may include merging their queues. Upon being set into a binding-enabled state, atoms may be bound to one another, meaning that they are associated with one another such they operate in a bound execution mode with respect to one another. One or more shared operations may then be executed collectively on the states of the bound atoms. Subsequently, upon performance of the one or more shared operations, the bound atoms may (although are not necessarily required to) return to traditional operation in the unbound state.

Thus, in some examples, the disclosed techniques may provide flexibility to allow atoms to operate as traditional actors while also allowing atoms to be bound together and operate differently than traditional actors. Accordingly, by providing this and other flexibility, the disclosed techniques may provide many benefits of traditional actor-based systems while also providing additional capabilities not available in traditional actor-based systems. In particular, by allowing operation of atoms in the unbound mode, the disclosed techniques may provide operational concurrency and parallelism in a manner similar to traditional actor-based systems. Additionally, by allowing operation of atoms in the unbound mode, the disclosed techniques may reduce complexity and improve efficiency, for example by allowing operations to be performed collectively on multiple atom states in a synchronous manner, by allowing operations to be performed atomically on multiple atom states, by allowing synchronous communications and state access between bound atoms, and in other ways. Moreover, in some examples, an atom-based model such as described herein may be provided as a service, thereby potentially simplifying operational tasks, improving efficiency and reliability, and reducing operational costs for customers of the service.

FIG. 1 is a diagram illustrating an example system for operation of bindable state maintaining components that may be used in accordance with the present disclosure. As shown, the example system of FIG. 1 includes a number of atoms 112-120 executing on computing devices 101A-C. Although the example system of FIG. 1 includes nine atoms spread across three computing devices, the disclosed techniques may be employed in relation to any number of atoms executing on any number of different computing devices. As will be described in detail below, atoms 112-120 are bindable state maintaining components. In particular, each atom 112-120 may maintain and perform computational operations on a respective associated state. For example, each atom 112-120 may have an associated address, may receive and respond to various messages, and may also send messages to other atoms. Atoms 112-120 may, for example, perform operations and change state in response to receiving of messages. In some examples, each atom 112-120 may be capable of sending asynchronous unordered messages to other atoms or to itself. Also, in some examples, each atom 112-120 may be synchronous and atomic (e.g., performs operations fully before initiating subsequent operations) within itself. Furthermore, in some examples, each atom 112-120 may be capable of spawning other atoms and may also be capable of terminating itself. In some cases, atoms that communicate with one another more frequently may generally execute on the same computing device, while atoms that communicate with one another less frequently may generally execute on different computing devices. Attempting to co-locate atoms in this manner may, in some examples, recue latency, improve responsiveness, and simplify the atom binding process described below.

In the particular example of FIG. 1, atoms 115-120 are unbound atoms that are not bound to any other atom. By contrast, atoms 112-114 are bound together to form a molecule 151. As set forth above, a molecule may include a combination of two or more bound atoms. Atoms 112-120 may be operable to switch between different modes of execution. In particular, unbound atoms 115-120 may operate in an unbound execution mode. In particular, while in the unbound execution mode, atoms 115-120 may be operable to concurrently perform different operations (e.g., asynchronously) on their own separate states. It is noted that use of the term concurrently, in this context, refers to performing different operations during at least partially overlapping time periods, and does not require that any operations must be performed during exactly matching time periods. By contrast, bound atoms 112-114 may operate in a bound execution mode. In particular, while in the bound execution mode, atoms that are bound to another (e.g., atoms 112-114) may be prohibited from concurrently performing different operations on their own separate states. It is noted, however, that atoms that are bound to another (e.g., atoms 112-114) may still perform different operations concurrently with atoms to which they are not bound (e.g., atoms 115-120). Additionally, unlike unbound atoms 115-120, atoms that are bound to another (e.g., atoms 112-114) may be operable to collectively (e.g., synchronously) perform shared operations on their multiple associated states. Furthermore, shared operations performed on the states of bound atoms 112-114 may be performed atomically, for example such that subsequent operations are not performed on the bound atoms 112-114 until the shared operation is fully performed on each associated atom state. Bound atoms 112-114 may also be permitted to communicate synchronously with one another (e.g., send synchronous ordered messages to one another) and to synchronously access each other's states. Additionally, in some examples, the states and state changes of bound atoms may also be saved and loaded consistently with one another.

In some cases, atoms may be bound together when, for example, it is advantageous to collectively (e.g., synchronously) perform a shared operation on the atoms' states, such as without having either atom's state separately altered by other operations during the collective performance of the shared operation. For example, consider the scenario in which a first atom is associated with a particular player in a video game (Player A) and a second atom is associated with a particular tree in the video game (Tree X). Now suppose that Player A is chopping Tree X to collect wood. In this scenario, it may be advantageous for the wood to be collectively removed from Tree X and transferred to Player A's inventory. Additionally, during the removal and transfer of the wood, it may also be advantageous to ensure that other operations are not concurrently performed on Player A or Tree X. For example, it may be desirable to ensure that another player doesn't kill Player A while he is collecting the wood. As another example, it may also be desirable to ensure that another player doesn't remove wood from Tree X while Player A is collecting his wood. For these and other reasons, attempting to perform such operations individually (e.g., asynchronously) on separate atom states may be problematic. For example, while Player A could attempt to separately collect wood from Tree X, Player A may have no way of being guaranteed that another player was not simultaneously collecting the same wood from Tree X. Additionally, while Tree X could attempt to separately transfer wood to Player A, Tree X may have no way of being guaranteed that Player A wasn't simultaneously being attacked by another player, being moved to a separate location, or being otherwise modified in a manner that would impair the collection of wood. Thus, for these and other reasons, binding of atoms may reduce complexity and improve efficiency and reliability, for example when collective changes to multiple atoms' states are desirable and in other cases. For example, in the scenario described above, the atoms associated with Player A and Tree X may be bound into a molecule in order to more efficiently and reliably perform the wood collection operation described above.

Figure 2:
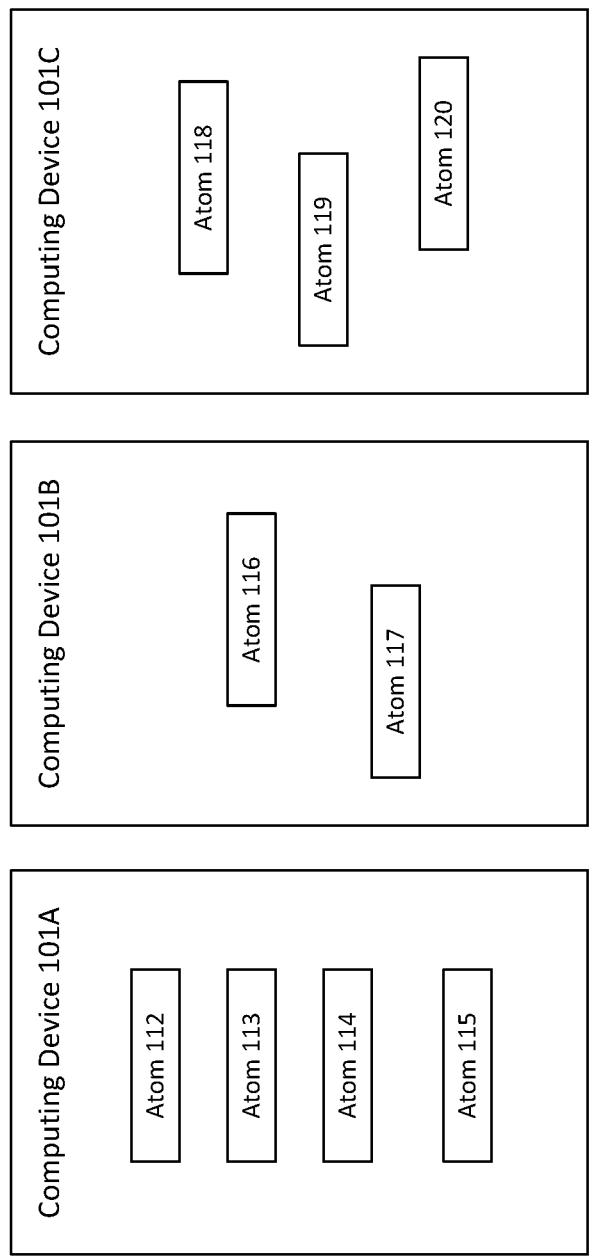
FIG. 2 is a diagram illustrating another example system for operation of bindable state maintaining components that may be used in accordance with the present disclosure.

In some examples, each of atoms 112-120 may be capable of being bound to, and unbound from, other atoms. For example, referring now to FIG. 2, an example is shown in which molecule 151 is terminated by the unbinding of atoms 112-114 from one another. In some examples, atoms may be unbound from one another after the performance of one or more shared operations that collectively change the multiple atoms' states. It is noted however, that there is no requirement that atoms must be unbound from one another immediately following (or within any specific time duration) after performance of such shared operations. In some cases, atoms may remain bound after performance of shared operations, for example if they frequently and repeatedly perform shared operations or for other reasons. In some examples, a group of bound atoms may remain bound until there is an explicit reason to break them up, such as if a subset of the bound atoms is requested for binding with other atoms. It is further noted that, in some examples, two or more separate molecules may be bound together, thereby binding together the atoms within each formerly separate molecule. Additionally, in certain examples, it is noted that a molecule may sometimes include only a single atom along with associated programming code or other information, for example related to processing of messages and relationships and exclusiveness between atoms.

The binding of atoms to one another may include associating the atoms with one another such they operate in a bound execution mode with respect to one another. In some cases, binding of atoms may be triggered based on various binding conditions. For example, a first atom may send an asynchronous message to a second atom that includes a synchronous reference to the first atom. As another example, the first atom may insert within its state a synchronous reference to the second atom. As yet another example, a first atom may issue an asynchronous request with asynchronous references to itself and to a second atom, and this asynchronous request may, in turn, invoke a synchronous function that is provided with synchronous references to the first and the second atom. For example, a game developer may write a synchronous "Take Wood from Tree Function" that operates to take wood from a tree and transfer it to a player's inventory. This function may operate synchronously on the both tree and the player, by, for example, collectively changing the states of both the tree and the player, for example such that, while the function is collectively changing those states, they cannot be changed by other operations. This function may be capable of receiving synchronous references to a particular player atom and a particular tree atom. Player A may then issue an asynchronous request to invoke the synchronous "Take Wood from Tree Function" with asynchronous references to Player A and to Tree X. The request may be issued asynchronously, for example such that it can be issued separately by Player A. This asynchronous request may, in turn, invoke the synchronous "Take Wood from Tree Function" and provide it with synchronous references to Player A and Tree X. The occurrence of these and other examples conditions may trigger a first atom and a second atom to bind to one another.

Figure 3A:
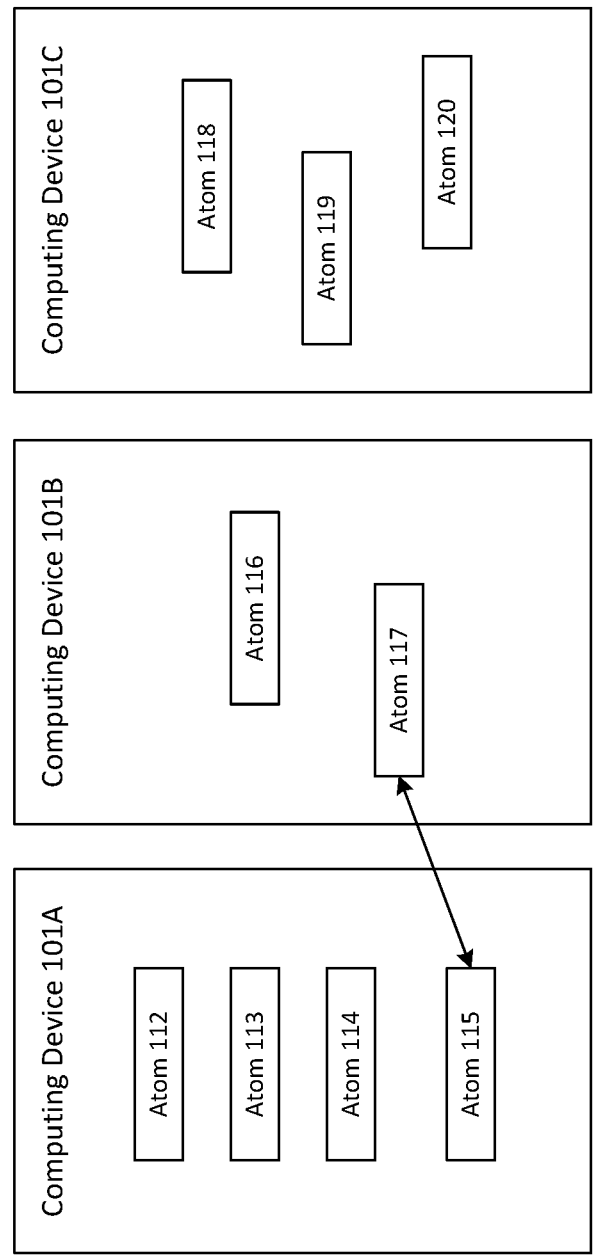
FIGS. 3A-3B are diagrams illustrating an example binding of atoms with atom migration that may be used in accordance with the present disclosure.

The occurrence of a binding condition, such as those described above, may, in turn, cause the atoms being bound (e.g., a first and a second atom) to each be set into a binding enabled-state. As will be described in detail below, the setting of atoms into a binding enabled-state may include, for example, determining whether the atoms are executing on the same computing device, causing the atoms to be co-located on the same computing device (if they are not already co-located), and merging their queues. In particular, in some examples, the co-locating of atoms on the same computing device may assist in binding of atoms, such as by allowing the bound atoms to be concurrently serviced by a single processing thread. Referring now to FIG. 3A, an example is shown in which a binding condition is detected for the binding of atoms 115 and 117, which is indicated in FIG. 3A by the double-sided arrow connecting atoms 115 and 117. As shown in FIG. 3A, atoms 115 and 117 are located on different computing devices, as atom 115 is on computing device 101A and atom 117 is on computing device 101B.

Figure 3B:
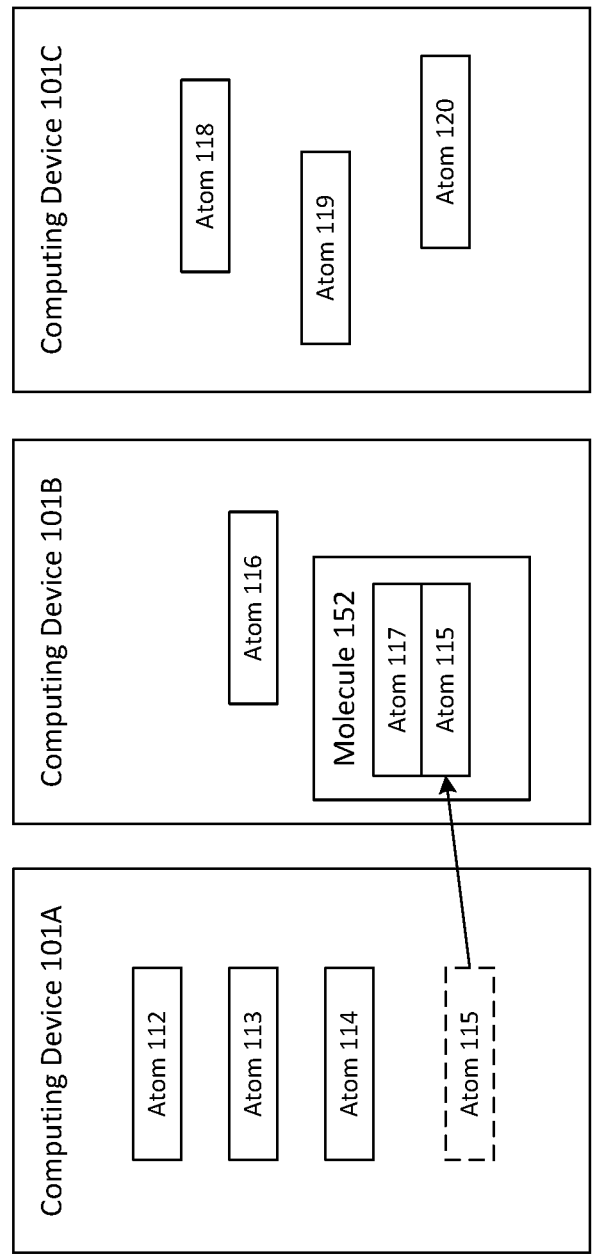

Referring now to FIG. 3B, it is seen that a determination is made to co-locate atoms 115 and 117 on computing device 101B. As shown, this co-location is accomplished by migrating atom 115 from computing device 101A to computing device 101B. In particular, atom 115 is shown with a dashed outline on computing device 101A to indicate that it has been migrated to computing device 101B, where it is shown with a solid outline. As also shown in FIG. 3B, upon being migrated to computing device 101B, atom 115 is bound with atom 117 to form molecule 152. It is noted that, if and when atoms 115 and 117 are eventually unbound from one another, atom 115 may, in some examples, be migrated back to computing device 101A. In other examples, atom 115 may not be migrated back to computing device 101A and remain on computing device 101B even after unbinding of atoms 115 and 117.

Figure 4A:
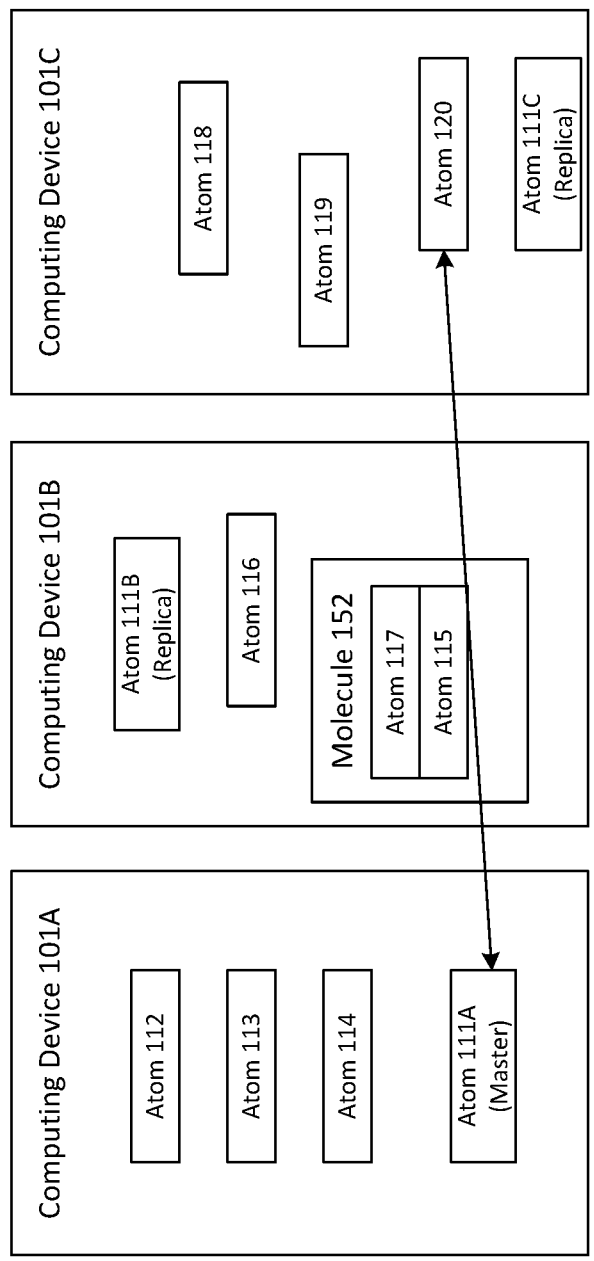
FIGS. 4A-4C are diagrams illustrating an example binding of atoms with switching of atom master control that may be used in accordance with the present disclosure.

Thus, FIGS. 3A-3B depict an example in which atoms are co-located by migrating one of the atoms. It is noted, however, that atom migration is merely one example technique for co-locating of atoms and that other alternative techniques may also be employed. For example, in some cases, atoms may be co-located by switching control of one of the atoms from a master version to a replica version. Referring now to FIG. 4A, it is seen that atom 111 has a number of different versions 111A-C executing on computing devices 101A-C. In particular, atom version 111A is a master version of 111 executing on computing device 101A. Additionally, atom versions 111B and 111C are replica versions of atom 111 executing on computing devices 101B and 101C, respectively. In some cases, maintaining of master and replica versions of one or more atoms may be advantageous, for example, by allowing greater redundancy and fault tolerance in the case of failure of one or more computing devices and for other reasons, including those described below. In some examples, the master version 111A may be considered to be the master authority of the state of atom 111, and may, for example, receive and respond to messages associated with computation of the state. Replica versions 111B and 111C may, in turn, receive changes to the state of atom 111 from (or on behalf of) master version 111A and store those changes.

As shown in FIG. 4A, a binding condition is detected for the binding of atoms 111 and 120, which is indicated in FIG. 3A by the double-sided arrow connecting atom master version 111A and atom 120. As also shown in FIG. 4A, atom master version 111A and atom 120 are located on different computing devices, as atom master version 111A is on computing device 101A and atom 120 is on computing device 101C. One option for co-locating atom master version 111A and atom 120 may be to migrate one or both of those atoms to a different computing device (e.g., as was done in the example of FIG. 3B). However, in some examples, migrating of atoms may involve unwanted cost and/or complexity. Accordingly, referring now to FIG. 4B, an alternative technique is employed in which the master version of atom 111 is switched from atom version 111A to atom version 111C. Thus, after performance of this switch, atom master version 111C will be co-located on computing device 101C with atom 120, thereby enabling atom 111 and atom 120 to be co-located on computing device 101C without migration of any atoms. In some examples, in order to transfer master control (e.g., ownership) of atom 111 from version 111A to 111C, version 111C (or an agent on its behalf) may contact version 111A (or an agent on its behalf) to request the transfer. Version 111A may then send a state update to version 111C and discontinue executing any further operations to change the state. In some examples, the transfer of master control from version 111A to version 111C may also be recorded, for example by notifying other replicas of atom 111 (e.g., replica version 111B) and/or other atoms (e.g., atoms 112-120).

Figure 4B:
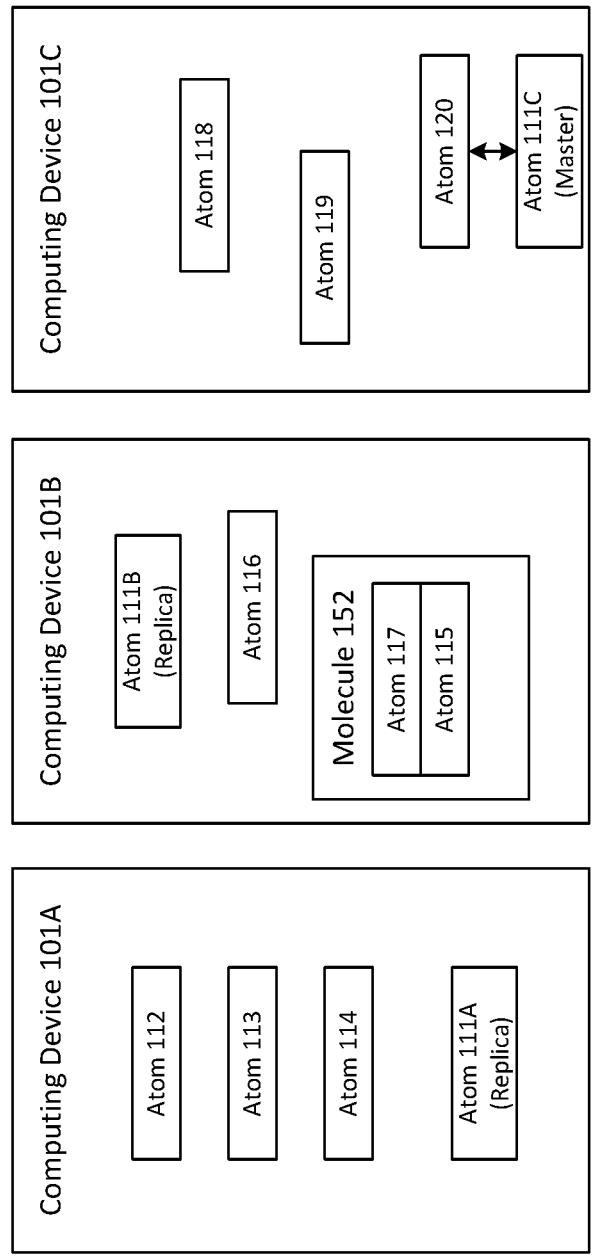
Figure 4C:
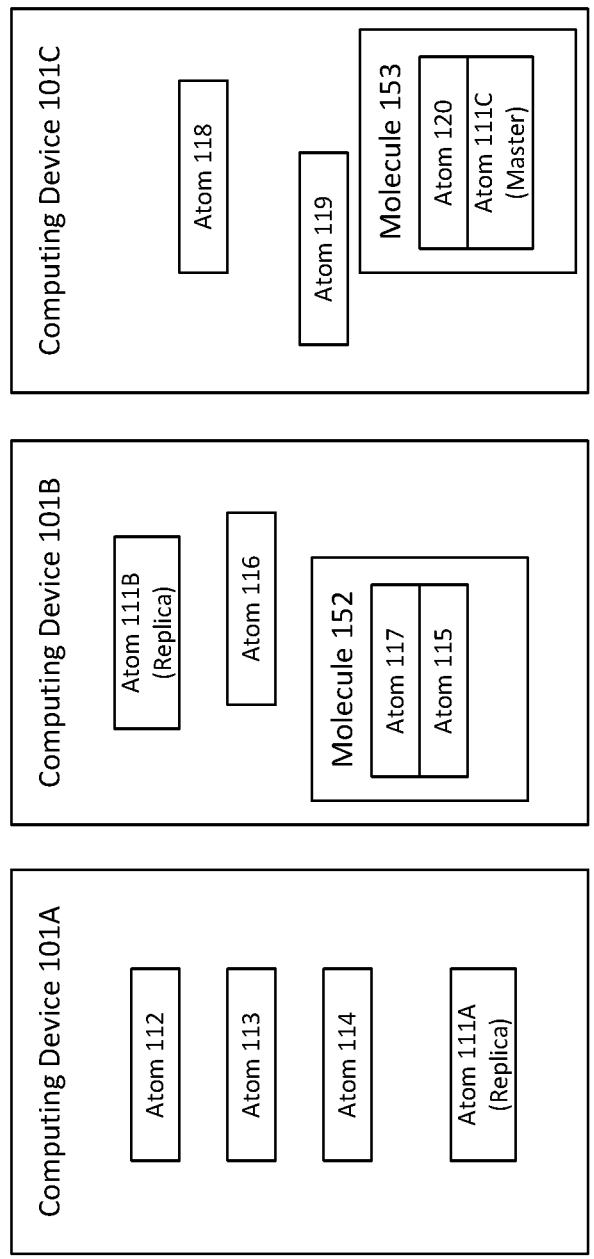

Referring now to FIG. 4C, it is seen that, upon switching master control of atom 111 from version 111A to version 111C, atoms 111 and 120 may be bound to one another to form molecule 153. It is noted that, if and when atoms 111 and 120 are eventually unbound from one another, master control of atom 111 may, in some examples, be transferred back from version 111C to 111A. In other examples, master control of atom 111 may remain with version 111C even after unbinding of atoms 111 and 120.

Figure 5:
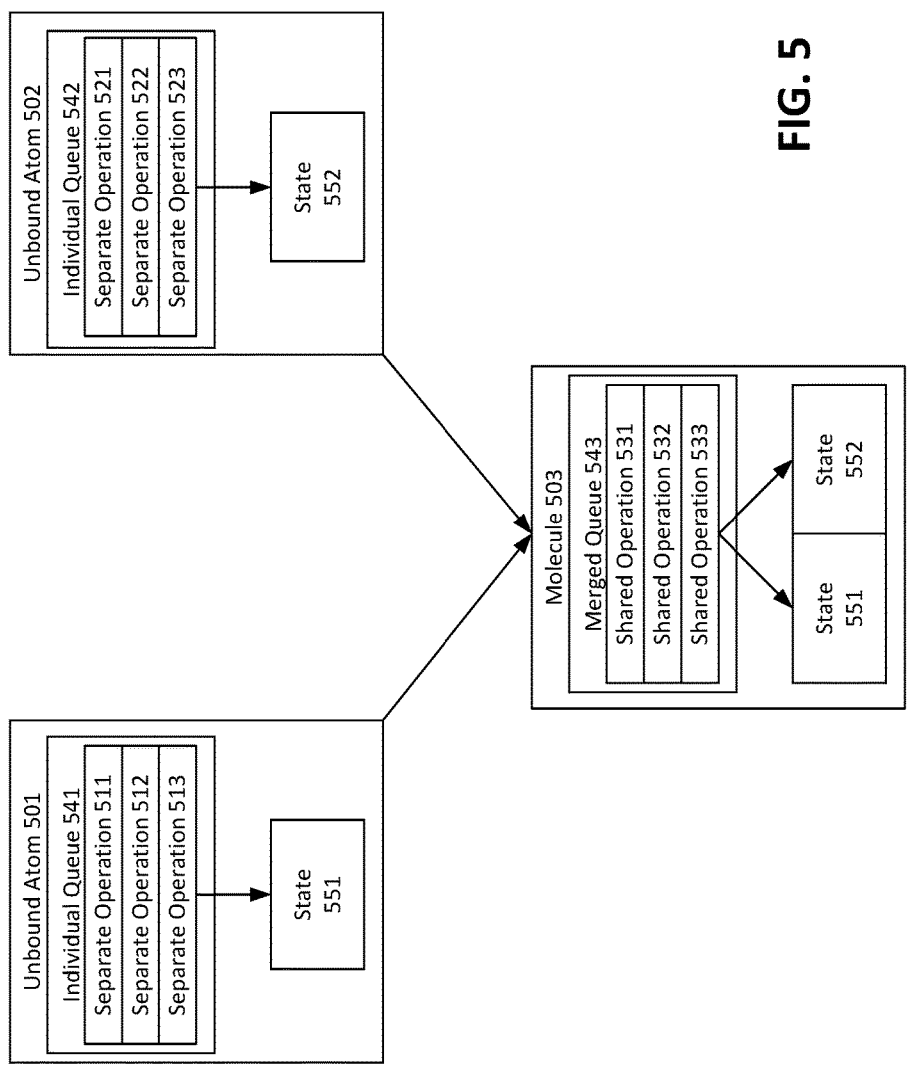
FIG. 5 is a diagram illustrating an example binding of atoms that may be used in accordance with the present disclosure.

Thus, various different techniques may be employed for co-locating of atoms onto the same computing device, including, for example, the atom migration and master control switching techniques set forth above. As also set forth above, while in the unbound execution mode, atoms may be operable to concurrently perform different operations on their own separate states. By contrast, while in the bound execution mode, atoms that are bound to one another may be prohibited from concurrently performing different operations on their own separate states. Additionally, unlike unbound atoms, atoms that are bound to one another may be operable to collectively perform shared operations on their multiple associated states. Referring now to FIG. 5, an example binding of atoms into a molecule will now be described in detail. In particular, FIG. 5 depicts unbound atoms 501 and 502 and also shows that unbound atoms 501 and 502 are subsequently bound into a molecule 503. As shown, unbound atoms 501 and 502 each include their own individual queues 541 and 542, respectively. Specifically, individual queue 541 includes separate operations 511-513, while individual queue 541 includes separate operations 521-523. Unbound atom 501 executes separate operations 511-513 on its respective associated state 551. Additionally, unbound atom 502 executes separate operations 521-523 on its respective associated state 552. Each of operations 511-513 and 521-523 are separate and different operations, which may be entirely unrelated to one another.

It is noted that, because unbound atoms 501 and 502 operate in the unbound execution mode, unbound atoms 501 and 502 may concurrently perform different operations on their respective associated states. For example, in some cases, atom 501 may be performing separate operation 513 on state 551 at the same time that atom 502 may be performing separate operation 523 on state 552. It is further noted that, to allow the concurrent performance of operations, unbound atoms 501 and 502 may be concurrently serviced by different processing threads. For example, in some cases, a first processing thread may execute operation 513 on state 551 at the same time that a second processing thread is executing operation 523 on state 552. The ability to perform different operations concurrently and/or in parallel with one another may be an advantage provided by the unbound execution mode that may improve efficiency and assist in capitalizing upon the advanced parallel processing capabilities of modern computer systems.

As also shown in FIG. 5, unbound atoms 501 and 502 are subsequently bound with one another into a molecule 503. As set forth above, in some examples, atoms that are being bound into a molecule may have their separate queues merged into a joint queue. In particular, it is shown that individual queues 541 and 542 in unbound atoms 501 and 502 are merged into a joint queue 543 in molecule 503. The merging of separate atom queues into a joint queue may help to ensure that atoms that are bound to one another cannot concurrently execute different operations on their own separate states. Additionally, the merging of separate atom queues into a joint queue may also help to enable shared operations (e.g., operations that are collective executed on multiple atom states) to be efficiently and reliably queued. In the particular example of FIG. 5, joint queue 543 includes three shared operations 531-533 which are executed collectively on atom states 551 and 552 (for example as indicated by the arrows from shared operation 533 to states 551 and 552). The ability to perform shared operations collectively on multiple bound atoms' states may be an advantage provided by the bound execution mode that may improve efficiency and reliability and reduce complexity, for example by helping to ensure that the bound atoms' states cannot be interfered with during the performance of the shared operations, such as by other atoms and/or other operations.

Figure 6:
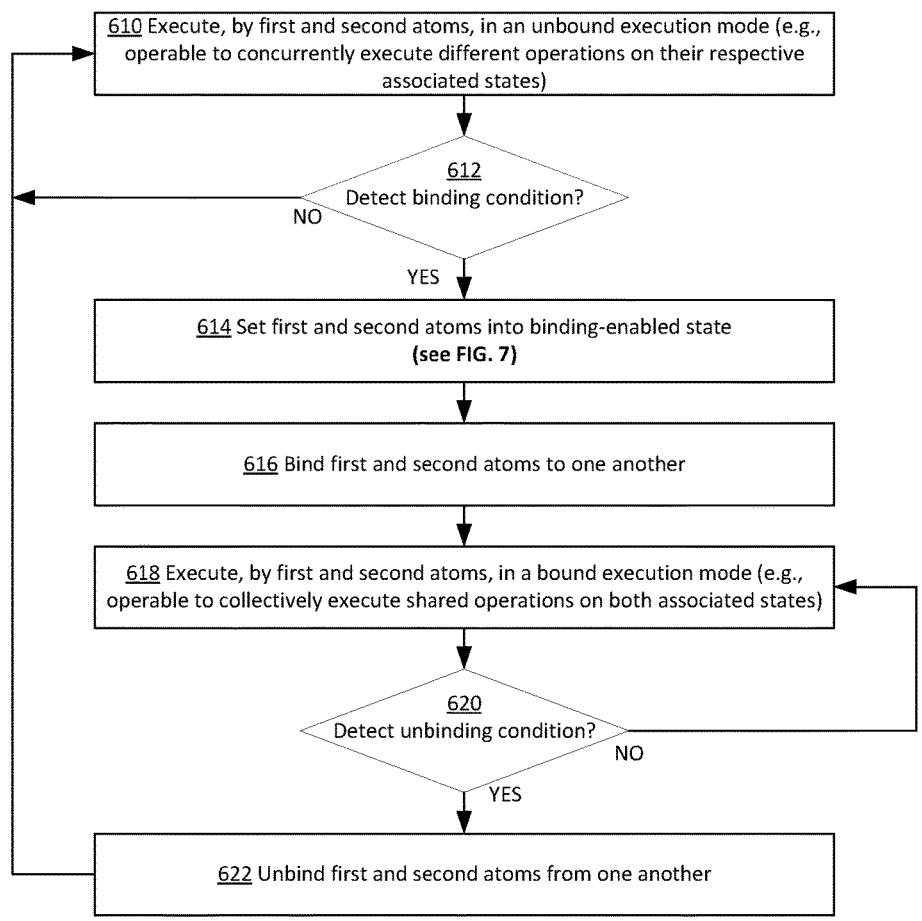
FIG. 6 is a flowchart illustrating an example process for operating of bindable state maintaining components that may be used in accordance with the present disclosure.

FIG. 6 is a flowchart illustrating an example process for operating of bindable state maintaining components (referred to herein as atoms) that may be used in accordance with the present disclosure. The operations described in FIGS. 6-7 and throughout the specification may also be referred to as acts. It is noted that, while the particular example of FIG. 6 is described with respect to two atoms (e.g., a first and a second atom) maintaining associated respective states (e.g., a first a second state), the disclosed techniques may be employed to operate, bind, and/or unbind any number of different atoms. As shown, the process of FIG. 6 initiates at operation 610, at which the first and the second atoms execute in an unbound execution mode. As set forth above, in some examples, while in the unbound execution mode, the first and the second atoms may operate in a manner that is similar or identical to traditional actors. For example, while in the unbound execution mode, the first and the second atoms may concurrently execute different operations (e.g., asynchronously) on their associated states, respectively. In particular, the first atom may execute a first operation on a first state maintained by the first atom, while the second atom may concurrently execute a second operation on a second state maintained by the second atom. In some cases, different processing threads may be invoked to concurrently process different operations on the first state and the second state. It is noted that, in the particular example of FIG. 6, the depicted process initiates with atoms executing in the unbound execution mode. However, there is no requirement that atoms must initiate operation in an unbound execution mode. For example, in some cases, the process depicted in FIG. 6 may instead be initiated at operation 618, with atoms initiating their execution as bound atoms in the bound execution mode.

At operation 612, it is determined whether a binding condition (or one or more binding conditions) that triggers binding of the first atom with the second atom is detected. In some examples, the binding condition may be detected by the first atom, the second atom, and/or by other agents or components. As set forth above, a number of different binding conditions may trigger binding of the first atom with the second atom. For example, the first atom may send an asynchronous message to the second atom that includes a synchronous reference to the first atom. As another example, the first atom may insert within its state a synchronous reference to the second atom. As yet another example, a first atom may issue an asynchronous request with asynchronous references to itself and to a second atom, and this asynchronous request may, in turn, invoke a synchronous function that is provided with synchronous references to the first and the second atom. For example, as set forth above, a game developer may write a synchronous "Take Wood from Tree Function" that operates to take wood from a tree and transfer it to a player's inventory. This function may be capable of receiving synchronous references to a particular player atom and a particular tree atom. Player A may then issue an asynchronous request to invoke the synchronous "Take Wood from Tree Function" with asynchronous references to Player A and to Tree X. This asynchronous request may, in turn, invoke the synchronous "Take Wood from Tree Function" and provide it with synchronous references to Player A and Tree X.

If, at operation 612, a binding condition is not detected, then the process may return to operation 610, and the first and the second atoms may continue to operate in the unbound execution mode. By contrast, if, at operation 612, a binding condition is detected, then operations 614, 616, and 618 may be performed in response to detecting of the binding condition. In particular, at operation 614 the first and the second atom are set into a binding-enabled state, which is a state that enables binding of the first atom with the second atom. An example process for setting of atoms into a binding-enabled state is described in detail below with respect to FIG. 7 and, therefore, will not be described here.

Upon setting of the first and the second atoms into a binding-enabled state, the first and the second atoms may be bound to one another at operation 616. As set forth above, the binding of the first atom with the second atom may include associating the atoms with one another such they operate in a bound execution mode with respect to one another. In some examples, the binding of atoms to one another may include registering and/or storing, such as in one or more data structures, one or more indications that the atoms are bound to one another, for example including their addresses, identifiers, or other references. Also, in some examples, the binding may include storing, in one or more data structures, an indication of a readiness state, for example indicating a readiness of the bound atoms to perform one or more shared operations. In some cases, the readiness state may be determined by the atom that requests the binding, for example based on messages received from the other bound atoms. Also, in some examples, when atoms are bound into a molecule, the molecule, or another representation of a unified execution context, may be referenced by atoms, for example to allow messages dispatched to them to be executed in the correct execution context. Furthermore, in some examples, a data structure may indicate how a molecule may be divided without breaking any standing bond. For example, consider the scenario in which a bond between Atoms A and B is created, and then bonds between Atoms B and C and Atoms C and D. This may result in a molecule with Atoms A, B, C, and D. In some examples, binding of these atoms may include indicating, in one or more data structures, a set of all active bonds (i.e., bonds between Atoms A-B, Atoms B-C, and Atoms C-D). Later, the bond between Atoms B and C may no longer be needed. By indicating the active bonds, a data structure may be used to determine that the Atom A-B part of the molecule can be moved away from the Atom C-D part of the molecule once the Atom B-C bond is no longer needed.

At operation 618, the first and the second bound atoms execute in the bound execution mode. As set forth above, while executing in the bound execution mode, the first and the second bound atoms may be operable to collectively (e.g., synchronously) perform one or more shared operations on both of their associated states. For example, a single processing thread may be invoked to process a shared operation collectively on the bound first and second atoms. Additionally, shared operations performed on the states of the bound first and second atoms may be performed atomically, for example such that subsequent operations are not performed on the bound atoms until a shared operation is fully performed on each associated atom state. The bound first and second atoms may also be operable to communicate synchronously with one another (e.g., send synchronous ordered messages to one another) and to synchronously access each other's states. Furthermore while executing in the bound execution mode, the first and the second bound atoms may be prohibited from concurrently performing different operations on their own respective associated states. For example, different processing threads may be prohibited from being invoked to concurrently perform different operations on the first state and the second state. It is noted, however, that bound atoms may still, in some examples, perform different operations concurrently with atoms to which they are not bound.

At operation 620, it is determined whether an unbinding condition (or one or more unbinding conditions) that triggers unbinding the first atom from the second atom is detected. In some examples, the unbinding condition may be detected by the first atom, the second atom, and/or by other agents or components. As set forth above, a number of different binding conditions may trigger unbinding of the first atom from the second atom. For example, in some cases, the atoms may be unbound from one another after the performance of one or more shared operations that collectively change the multiple atoms' states. However, there is no requirement that atoms must be unbound from one another immediately following (or within any specific time duration) after performance of such operations. In some cases, atoms may remain bound after performance of shared operations, for example if they frequently perform shared operations or for other reasons. In some examples, a group of bound atoms may remain bound until there is an explicit reason to break them up, such as if a subset of the bound atoms is requested for binding with other atoms.

If, at operation 620, an unbinding condition is not detected, then the process may return to operation 618, and the bound first and second atoms may continue to operate in the bound execution mode. By contrast, if, at operation 620, an unbinding condition is detected, then operations 622 and 610 may be performed in response to detecting of the unbinding condition. In particular, at operation 622, the first and the second atoms are unbound from one another. In some examples, unbinding of the first and the second atoms from one another may include disassociating the first and the second atoms with one another such they cease to operate in a bound execution mode with respect to one another. In some examples, the unbinding of atoms to one another may include removing, by each atom being unbound, an address, identifier, or other reference indicating the other atoms from which it is being unbound. Also, in some examples, unbinding of the first and the second atoms from one another may include unmerging their operational queues from one another into separate respective operational queues. Additionally, for examples in which one or more atoms were migrated to facilitate binding, the unbinding of atoms from one another may (although need not necessarily) include returning (e.g. re-migrating) one or more of the atoms back to a computing device on which the atoms executed prior to binding. Furthermore, for examples in which master control of one or more atoms was switched to facilitate binding, the unbinding of atoms from one another may (although need not necessarily) include returning master control of the one or more of the atoms back to a former master version of the atom, thereby turning the bounded version of the atom back into a replica version.

In the particular example of FIG. 6, the first and the second atom are only bound to one another and are not bound to any other atoms. Accordingly, in the example of FIG. 6, the unbinding of the first and the second atom from one another at operation 622 causes the first and the second atom to both return to operation in the unbound execution mode at operation 610. It is noted, however, that, in other examples, the first and the second atoms may bind to other atoms. In these examples, it is possible that, after unbinding from one another, the first and/or the second atom may remain bound to other atoms and may continue to execute in the bound execution mode with respect to those atoms.

Figure 7:
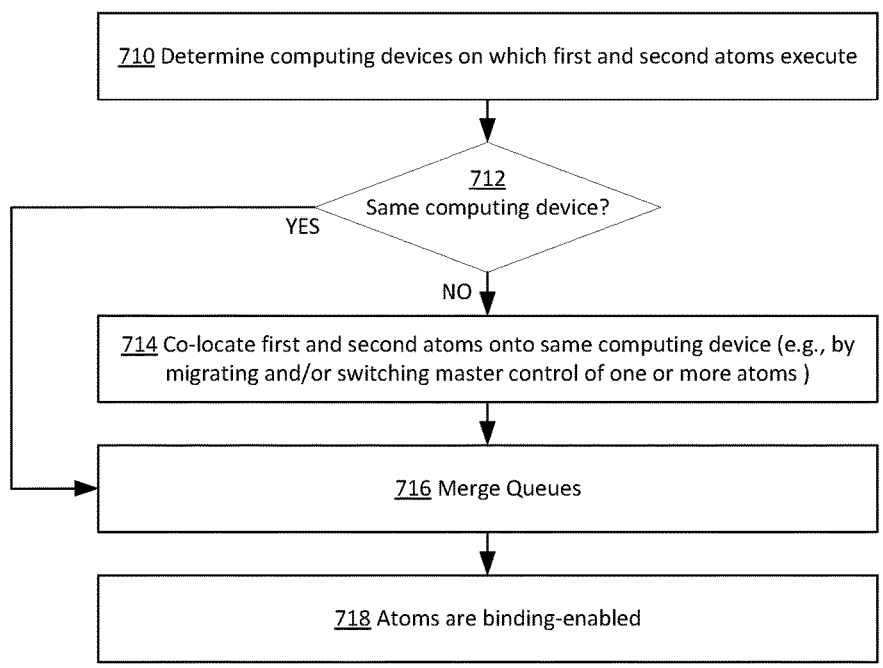
FIG. 7 is a flowchart illustrating an example process for setting atoms into a binding-enabled state that may be used in accordance with the present disclosure.

Thus, as set forth above, a process such as shown in FIG. 6 may be employed to operate first and second atoms, including binding and unbinding of the first and the second atoms to and from one another. As also set forth above, upon detecting of one or more binding conditions for binding of the first atom to the second atom (e.g., as shown at operation 612), the first and the second atom may be set into a binding-enabled state (e.g., as shown at operation 614). FIG. 7 is a flowchart illustrating an example process for setting the first and the second atoms into a binding-enabled state that may be used in accordance with the present disclosure. In some examples, the process of FIG. 7 may be performed by one or more of the first atom, the second atom, and/or other agents or components. As shown, the process of FIG. 7 is initiated at operation 710, at which the computing devices on which the first and the second atoms are executing are determined. In some examples, this information may be reported by the first and the second atoms and/or by one or more agents associated therewith.

At operation 712, it is determined whether the first and the second atoms are co-located on the same computing device. If not, then, at operation 714, the first and the second atom are co-located onto the same computing device. In particular, in some examples, the co-locating of atoms onto the same computing device may assist in binding of atoms, such as by allowing the bound atoms to be concurrently serviced by a single processing thread. In some examples, the first and the second atom may be co-located onto the same computing device by migrating one or more of the atoms. In particular, FIGS. 3A-3B depict an example in which a first atom (e.g., atom 115) is migrated from a first computing device (e.g., computing device 101A) to a second computing device (e.g., computing device 101B) on which a second atom (e.g., atom 117) is executed. In other examples, both the first and the second atom may be migrated from their current computing devices to a common computing device.

Additionally, in some examples, atoms may be co-located by switching master control of one or more of the atoms from a previous master version to a previous replica version. In particular, FIGS. 4A-4B depict an example in which master control of an atom (e.g., atom 111) is switched from a previous master version (e.g., version 111A) on a first computing device (e.g., computing device 101A) to a previous replica version (e.g., version 111C) on a second computing device (e.g., computing device 101C) on which a second atom (e.g., atom 120) executes.

Upon co-locating of the first and the second atoms (or determining at operation 712 that the atoms were already co-located), the proceeds to operation 716, at which the respective separate queues of the first and the second atoms are merged into a joint queue, such as shown in the example depicted in FIG. 5. As set forth above, the merging of separate atom queues into a joint queue may help to ensure that atoms that are bound to one another cannot concurrently execute different operations on their own separate states. Additionally, the merging of separate atom queues into a joint queue may also help to enable shared operations (e.g., operations that are collective executed on multiple atom states) to be efficiently and reliably queued. At operation 718, upon merging of their queues, the first and the second atoms are binding-enabled. Thus, upon completion of operation 718, the first and the second atoms may be bound to one another, for example as described above with reference to operation 616. In some examples, prior to being bound, the first and second atoms may also be stopped from executing in the unbound execution mode with respect to one another.

In some examples, bindable state maintaining components may be provided as a service, for example to game developers or other customers. For example, in some cases, customers may pay a fee to have their content hosted by computing systems that perform computing operations, at least in part, using bindable state maintaining components, such as using the techniques described above. For at least the reasons described above, the use of bindable state maintaining components may, in some examples, simplify the design and operation of video games and other hosted content, as well improving the efficiency and responsiveness of such content. This may improve the experience for users of the content (e.g., video game players) as well as potentially reducing design complexity and operational costs for developers and other customers.

Figure 8:
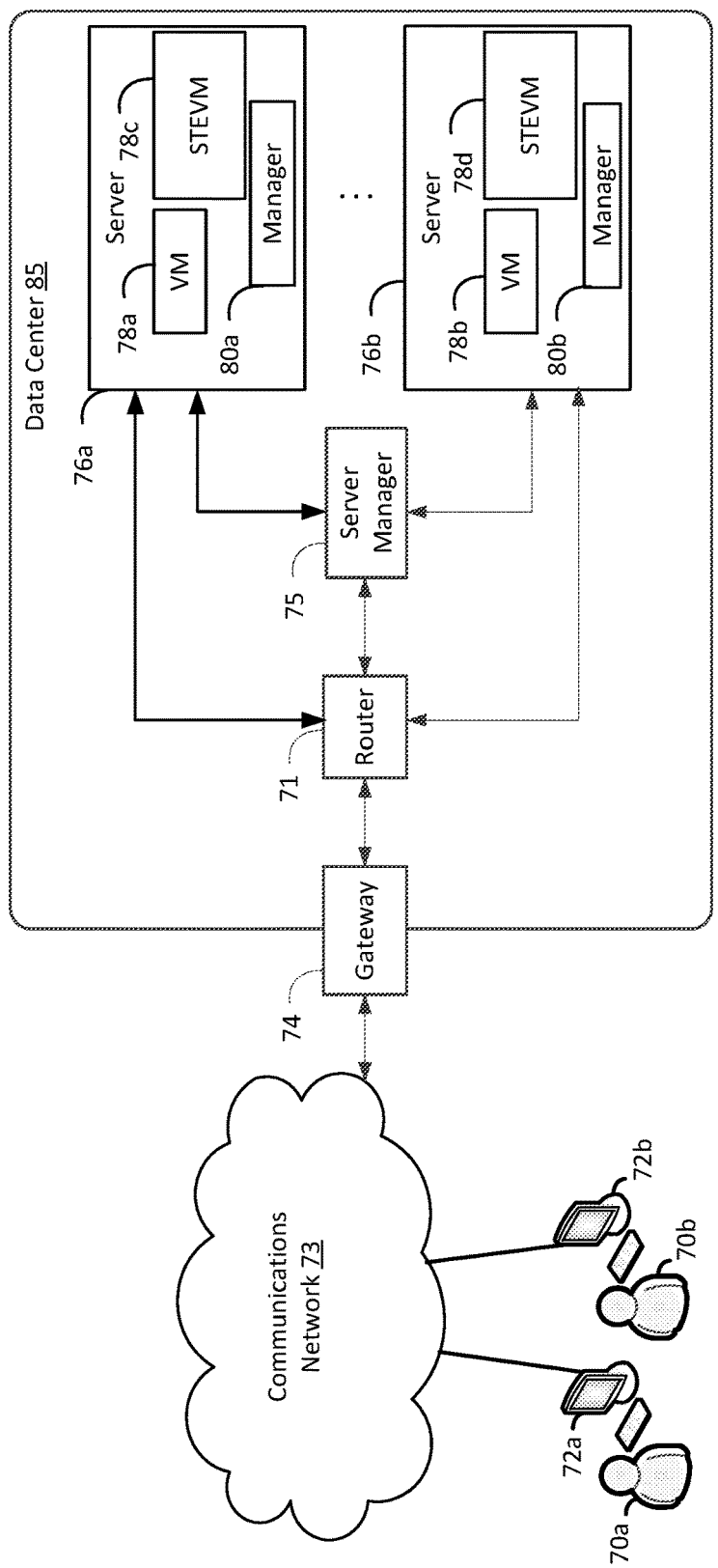
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are atom operational virtual machine ("AOVM") instances. The AOVM virtual machine instances 78c and 78d may be configured to perform all, or any portion, of the techniques for operation of bindable state maintaining components (atoms) and/or any other of the disclosed techniques in accordance with the present disclosure and described in detail above. As should be appreciated, while the particular example illustrated in FIG. 8 includes one AOVM virtual machine in each server, this is merely an example. A server may include more than one AOVM virtual machine or may not include any AOVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors.

Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
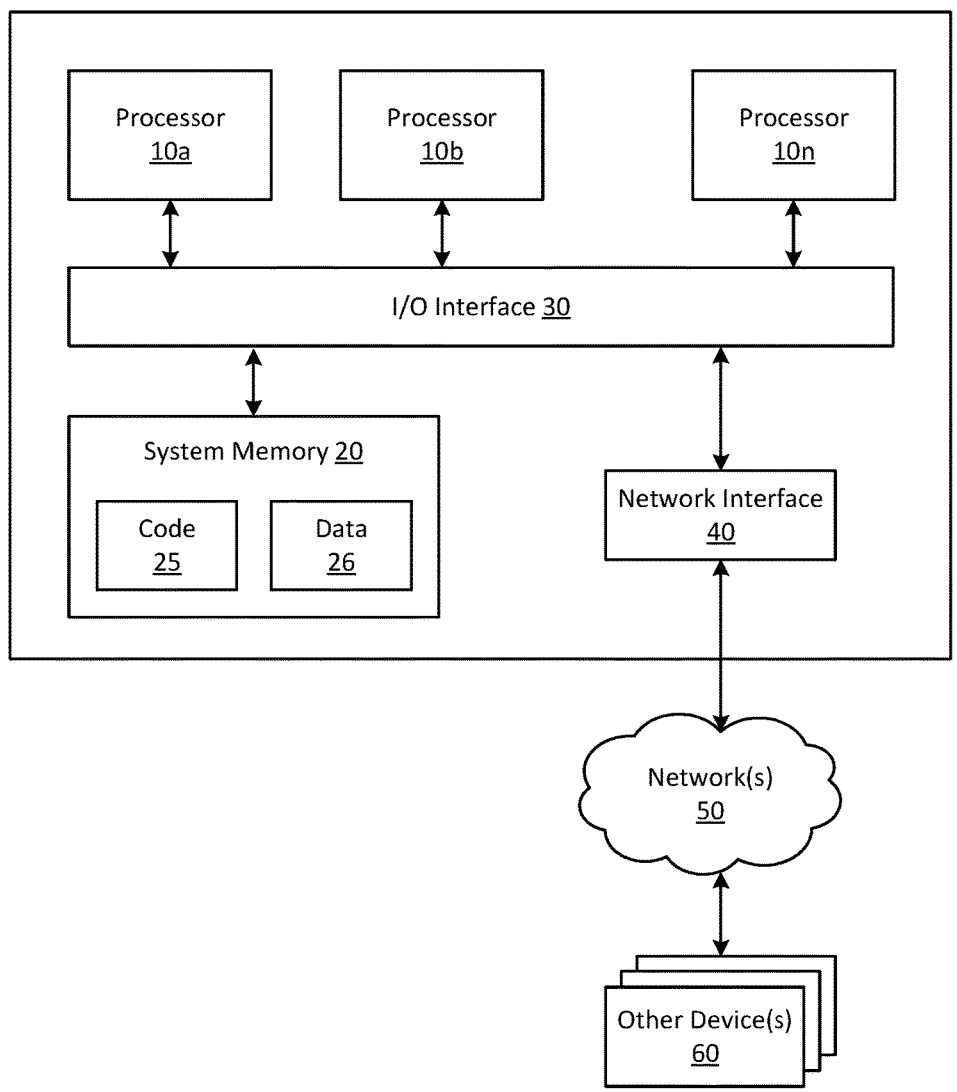
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10).

In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system perform acts comprising:
executing, by a first actor maintaining a first state and a second actor maintaining a second state, in a first execution mode in which the first actor and the second actor are operable to concurrently execute different operations on the first state and the second state, respectively, wherein the first actor and the second actor are associated with an actor-based model in which computing and maintaining of a plurality of states including the first state and the second state are performed by a plurality of actors including the first actor and the second actor;

detecting at least one binding condition that triggers binding of the first actor with the second actor;

binding the first actor with the second actor, whereby, upon being bound, the first actor and the second actor execute in a second execution mode in which the first actor and the second actor are operable to collectively execute one or more shared operations on both the first state and the second state; and unbinding the first actor from the second actor, whereby, upon being unbound, the first actor and the second actor return to the executing in the first execution mode.

2. The computing system of claim 1, wherein at least one shared operation is executed at least one of synchronously or atomically on both the first state and the second state.

3. The computing system of claim 1, wherein, while executing in the second execution mode, the first actor and the second actor are operable to perform at least one of communicating synchronously with one another or synchronously accessing each other's maintained states.

4. The computing system of claim 1, wherein the binding condition comprises at least one of an asynchronous message, from the first actor, with a synchronous reference to the second actor or a reference to the second actor inserted, by the first actor, into the first state.

5. A method comprising:

executing, by a first actor maintaining a first state and a second actor maintaining a second state, in a first execution mode in which the first actor and the second actor are operable to execute different operations during at least partially overlapping time periods on the first state and the second state, respectively, wherein the first actor and the second actor are associated with an actor-based model in which computing and maintaining of a plurality of states including the first state and the second state are performed by a plurality of actors including the first actor and the second actor;

detecting at least one binding condition that triggers binding of the first actor with the second actor; and binding the first actor with the second actor, whereby, upon being bound, the first actor and the second actor execute in a second execution mode in which the first actor and the second actor are operable to collectively execute one or more shared operations on both the first state and the second state.

6. The method of claim 5, wherein the binding comprises storing, in one or more data structures, at least one of an indication that the first actor and the second actor are bound or an indication of a readiness of the first actor and the second maintaining component actor to perform the one or more shared operations.

7. The method of claim 5, wherein, while executing in the second execution mode, the first actor and the second actor are operable to perform at least one of communicating synchronously with one another or synchronously accessing each other's maintained states.

8. The method of claim 5, wherein the binding condition comprises at least one of an asynchronous message, from the first actor, with a synchronous reference to the second actor or a reference to the second actor inserted, by the first actor, into the first state.

9. The method of claim 5, further comprising:

unbinding the first actor from the second actor, whereby, upon being unbound, the first actor and the second actor return to the executing in the first execution mode.

10. The method of claim 5, wherein, while the first actor and the second actor are executing in the second execution mode, different operations are prohibited from being concurrently executed on the first state and the second state.

11. The method of claim 5, wherein the method further comprises:

migrating the first actor from a first computing device to a second computing device on which the second actor executes.

12. The method of claim 5, wherein a master version of the first actor executes on a first computing device, a replica version of the first actor executes on a second computing device, and the second actor executes on the second computing device, and wherein the method further comprises:

switching master control of the first actor to the replica version of first actor.

13. The method of claim 5, wherein the method further comprises:

merging a first operational queue of the first actor with a second operational queue of the second actor.

14. The method of claim 5, further comprising providing bindable actors as a service.

15. One or more non-transitory computer-readable storage media having stored thereon instructions that, upon execution by one or more computing devices, cause the one or more compute nodes to perform acts comprising:

binding a first actor that maintains a first state with a second actor that maintains a second state, whereby, upon being bound, the first actor and the second actor execute in a first execution mode in which the first actor and the second actor are operable to collectively execute one or more shared operations on both the first state and the second state, wherein the first actor and the second actor are associated with an actor-based model in which computing and maintaining of a plurality of states including the first state and the second state are performed by a plurality of actors including the first actor and the second actor; and after performing the one or more shared operations, unbinding the first actor from the second actor, whereby, upon being unbound, the first actor and the second actor execute in a second execution mode in which the first actor and the second actor are operable to concurrently execute different operations on the first state and the second state, respectively.

16. The one or more non-transitory computer-readable storage media of claim 15, wherein the binding comprises storing, in one or more data structures, at least one of an indication that the first actor and the second actor are bound or an indication of a readiness of the first actor and the second actor to perform the one or more shared operations.

17. The one or more non-transitory computer-readable storage media of claim 15, wherein the binding is triggered by detecting of a binding condition.

18. The one or more non-transitory computer-readable storage media of claim 17, wherein the acts further comprise:

migrating the first actor from a first computing device to a second computing device on which the second actor executes.

19. The one or more non-transitory computer-readable storage media of claim 17, wherein a master version of the first actor executes on a first computing device, a replica version of the first actor executes on a second computing device, and the second actor executes on the second computing device, and wherein the acts further comprise:

switching master control of the first actor to the replica version of first actor.

20. The one or more non-transitory computer-readable storage media of claim 17, wherein, when the first and the second actors are bound to one another, changes to the first and the second states are saved consistently with one another.

\* \* \* \* \*